United States Patent [19]
Jureit et al.

[11] 3,811,578
[45] May 21, 1974

[54] APPARATUS FOR UNLOADING AND STACKING WOODEN STRUCTURAL FRAMES

[75] Inventors: John Calvin Jureit, Coral Gables; Adolfo Castillo, Miami, both of Fla.

[73] Assignee: Automatic Building Components, Inc., Miami, Fla.

[22] Filed: Sept. 19, 1972

[21] Appl. No.: 290,315

[52] U.S. Cl. ................................... 214/7, 198/35
[51] Int. Cl. ............................................ B65g 57/28
[58] Field of Search .......... 214/6 B, 6 C, 7; 198/35; 271/87

[56] References Cited
UNITED STATES PATENTS

| | | | |
|---|---|---|---|
| 3,389,812 | 6/1968 | Jureit et al. | 214/7 |
| 3,517,834 | 6/1970 | Adams | 214/7 |
| 3,502,229 | 3/1970 | Butler | 214/6 B |
| 3,002,326 | 10/1961 | Carter et al. | 214/6 C |
| 3,437,216 | 4/1969 | McGlinchey | 214/7 |
| 3,664,520 | 5/1972 | Parnet | 214/7 |

FOREIGN PATENTS OR APPLICATIONS

| | | | |
|---|---|---|---|
| 1,014,482 | 8/1957 | Germany | 198/35 |

Primary Examiner—Robert J. Spar
Attorney, Agent, or Firm—LeBlanc & Shur

[57] ABSTRACT

Disclosed is a conveyor table disposed at the output end of a structural frame prefabricating line. Unloading and stacking assemblies to one side of the table carry raising arms underlying the conveyor. Each assembly carries a carriage which mounts a rearwardly inclined stacker arm pivotally mounted for swinging movement from a raised stacking position to a generally horizontally disposed frame unloading position to one side of the associated assembly. The raising arms displace the horizontally disposed frame from the conveyor to a generally vertical but over-center position against the inclined stacking arms. Upon return of the raising arms to the conveyor, the carriages are retracted a distance equal to the width of the frame. Upon retracting movement of the carriages a predetermined distance, the stacking arms are unlocked from the carriage and the weight of the frames is transferred to the arms to maintain them in the upright position. After a predetermined number of frames are stacked, the frames are banded together and lifted from the assemblies whereupon the stacker arms pivot to their generally horizontal position for movement in a forward direction toward the conveyor for receiving additional frames.

17 Claims, 11 Drawing Figures

APPARATUS FOR UNLOADING AND STACKING WOODEN STRUCTURAL FRAMES

The present invention relates to machinery for use in conjunction with the prefabrication of wooden structural elements, i.e., frames, trusses and the like, and particularly relates to an apparatus for unloading and stacking structural frames produced by prefabricated framing machinery.

In recent years, there has developed a trend in the building construction industry toward the prefabrication of wooden structural frames, trusses and the like, the terms frames and trusses being hereinafter used interchangeably. This trend is due in part to the savings in cost and other economies and technical advantages in fabricating such trusses at a plant or fabrication site and transporting the trusses to the building site for assembly. Concurrently with this revolutionary mode of building construction, there has been developed vastly improved methods of forming the trusses. Particularly, the advent of structural butt joints formed by the embedment of the teeth of sheet metal connector plates such as, for example, the connector plates disclosed in U.S. Pat. No. 2,877,520 of common assignee herewith, has eliminated and/or minimized many of the shortcomings of prior truss formation. As a result, prefabrication machinery has now been developed to the extent that trusses are now formed on an assembly line basis. For example, see U.S. Pat. No. 3,602,237 of common assignee herewith. In that patent, there is disclosed a truss fabricating system wherein structural elements ultimately forming the truss are disposed on a jig table mounted on a conveyor for movement through a press position. Connector plates are spotted on opposite sides of the joints of these elements and the jig table, elements, and connector plates are stepped through the press with the latter embedding the teeth of the connector plates into the structural elements to join them one to the other and thereby form the truss. Upon emergence of the completed truss from the press, the trusses are often manually removed from the jig table and stacked for later bundling and transportation to the building site, which, as will be appreciated, is a laborious time consuming job. In prior U. S. Pat. No. 3,389,812 of common assignee herewith there is disclosed an apparatus for unloading the prefabricated trusses from a conveyor line and storing them. This constitutes a vast improvement over the use of manual labor in removing the trusses from the jig table particularly where the trusses are extremely heavy.

In another apparatus for unloading trusses manufactured by Idaco Engineering and Equipment Company of California, there is provided a cart mounting three spaced supports with both stacking and raising arms carried by the end supports. The raising arms are pivoted between a position underlying a horizontally disposed truss and a position locating a vertically disposed truss against the upright stacking arms. The trusses are stacked in vertical positions one against the other on the supports with each newly stacked truss sliding the stacked trusses rearwardly along the supports. However, there appears a number of disadvantages to this system among which include the inability of the system to automatically align the trusses relative to one another. As a consequence, the banding of stacked but misaligned trusses becomes very difficult. Also, that system cannot readily accommodate trusses of different lengths as the raising arms thereof are connected by a synchronized shaft which precludes widening or shortening the distance between the supports. Still further, the stacking arms of that system are fixed on a generally upright position necessitating movement of the cart from the truss assembly line in order to remove the stacked trusses from the unloader.

The present invention provides a novel and improved apparatus for unloading and stacking trusses from a truss prefabrication assembly line and which apparatus has various advantages in construction, mode of operation and use in comparison with the previously noted truss unloading apparatus. Particularly, the present invention provides a conveyor table adjacent to and spaced slightly above a conveyor line on which trusses are prefabricated. Suitable known apparatus is provided for peeling the truss from its jig table and disposing the completed truss on the conveyor table. The conveyor table includes powered rollers which drive the truss against a stop which actuates the truss unloading cycle and also locates the truss for alignment with previously unloaded trusses. To one side of the conveyor table, there is provided a pair of unloading and stacking support assemblies having raising arms which underlie trusses disposed on the elevated conveyor table. Each assembly mounts a carriage which, in turn, carries a stacking arm for pivotal movement between a raised, slightly rearwardly inclined stacking position and a lowered out-of-the-way position. Each carriage is mounted on its support assembly for movement toward and away from the conveyor table and along a slightly downwardly inclined path in a direction away from the conveyor table. In this manner, the stacking arms, in their raised position, incline upwardly and away from the conveyor table.

In use, the truss is peeled from the assembly line conveyor onto the conveyor table and driven against the stop. This stop initiates an unloading cycle causing the raising arms to displace the truss from its generally horizontal position on the conveyor table into a generally vertical but slightly over-center position against the rearwardly inclined stacking arms. Upon return of the raising arms to their generally horizontal position for lifting the next truss, the carriages, stacking arms and truss carried thereby are indexed or conveyed away from the conveyor table a distance substantially equal to the thickness of a single truss. By repeating this sequence of operations, additional trusses can be raised and stacked against the previously stacked truss or trusses and in proper alignment therewith.

The stacking arms are maintained in their raised stacking position by capture arms engageable with capture plates carried by the support assemblies. Upon stacking a predetermined numer of trusses, the capture arms are released from the capture plates and the weight of the trusses is transferred to the capture arms to maintain the stacking arms in their raised positions for stacking additional trusses. After a large number of trusses are stacked, they are banded together and lifted from the stacking arms whereby the latter are free to rotate to the horizontal out-of-the-way position. Additional secondary stacking arms are also provided on the support assemblies and can be raised into position to receive a selected number of trusses when the primary stacking arms are stacked to capacity with completed trusses. This eliminates any stop or slowdown in the truss production line. Also, it will be appreciated that the apparatus hereof is not moved from adjacent the truss assembly line upon removal of the stacked and banded trusses.

It is a further significant feature hereof that the unloading and stacking apparatus is readily adapted for unloading and stacking large, small or intermediate sized trusses. It will be appreciated that devices, such as fork lift trucks, are utilized to lift the banded trusses from the apparatus and that interference between the apparatus, particularly the stacking arms, and the lifting devices must be precluded. To accomplish this, the stacking arms are interchangeably mounted on the carriages for projection on either side of the support assembly. In this manner, the area between any adjacent pair of support assemblies can be maintained clear permitting the lifting devices to run up between such pair of support assemblies without interference from the stacking arms.

Also, it will be noted that the raising arms hereof are synchronized one with the other by a fluid system. This permits relative positioning of the support assemblies as desired and in accordance with the size of the trusses being fabricated.

Accordingly, it is a primary object of the present invention to provide a novel and improved apparatus for unloading and stacking wooden structural frames and the like.

It is another object of the present invention to provide a novel and improved unloading and stacking apparatus for wooden structural frames and the like which is operable to displace a frame from a generally horizontally disposed position as it emerges from frame fabrication machinery into a generally vertical position for stacking with additional frames and subsequent banding. It is a related object to provide apparatus for aligning the raised frame with previously stacked frames.

It is still another object of the present invention to provide a novel and improved apparatus for unloading and stacking wooden structural frames and the like which is automatic in operation and displaces the completed frames from a horizontal position into a stacked generally vertical position in response to movement of the frames along the fabrication assembly line.

It is a further object of the present invention to provide a novel and improved apparatus for unloading and stacking wooden structural frames wherein the stacking of the frames is accomplished without resort to manual labor.

It is a still further object of the present invention to provide a novel and improved apparatus for unloading and stacking wooden structural frames including an auxiliary device for stacking additional frames simultaneously as a predetermined number of previously stacked frames are removed from the apparatus whereby the truss fabrication assembly line is not interrupted by removal of the stacked frames.

It is a related object of the present invention to provide an apparatus having the foregoing characteristics which is readily and easily fabricated, comparatively inexpensive to construct, and readily operable by virtually unskilled labor.

It is a further related object of the present invention to provide a novel and improved unloading and stacking apparatus for wooden structural frames and the like which is readily and easily adapted for unloading large frames and in a manner avoiding interference between the apparatus per se and devices, such as fork lift trucks, for lifting the completed frames from the unloading and storing apparatus.

These and further objects and advantages of the present invention will become more apparent upon reference to the following specification, appended claims and drawings wherein:

Figure 1:
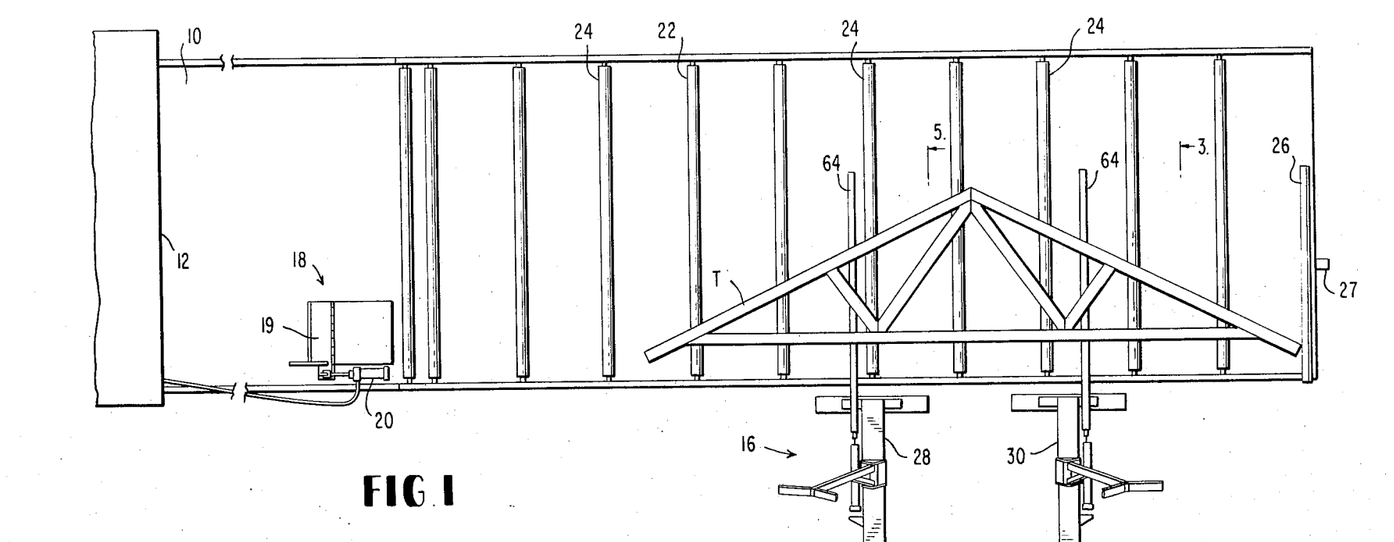
FIG. 1 is a plan view of an unloading and stacking apparatus for frames and the like constructed in accordance with the present invention and illustrating a pair of unloading and stacking assemblies.
Figure 2:
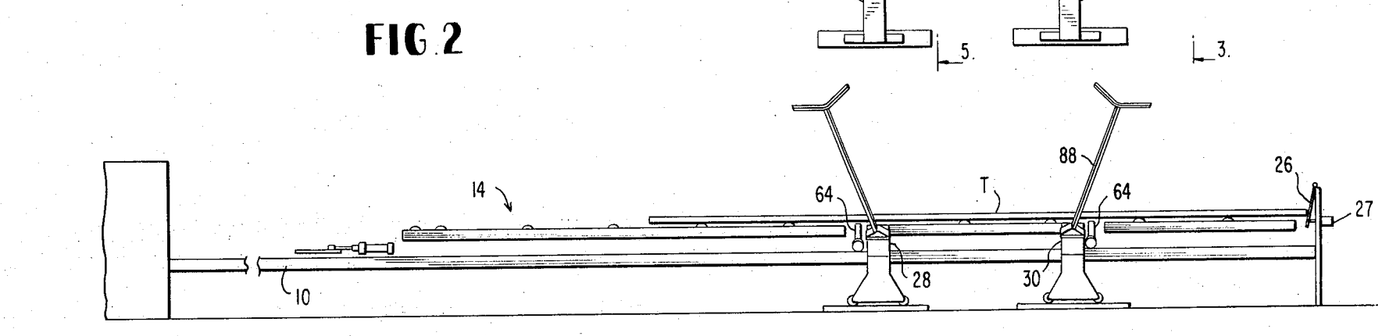
FIG. 2 is a side elevational view thereof.

Referring now to the drawings, particularly to FIG. 1, there is disclosed a conveyor generally indicated 10 for receiving the jig mounted prefabricated trusses, indicated T, as they emerge from a press indicated 12. As noted previously, trusses may be prefabricated by the fabrication system disclosed in U.S. Pat. No. 3,602,237 of common assignee herewith. Briefly, the structural elements forming the truss are disposed on a jig table with connector plates of the type illustrated in prior U.S. Pat. No. 2,877,520, also of common assignee herewith, spotted on opposite sides of the joints of the framing members. The members are then clamped to the jig table. The jig table is then stepped through a press with the press being actuated, upon registry of a frame joint between the press platens, to embed the teeth of the connector plates into the joints of the members thereby completing the frame. It will thus be appreciated that, as the truss emerges from the press, it rests on the jig table, the press automatically unlocking the clamps retaining the structural members in proper position and thereby releasing the completed frame or truss for removal from the jig table. The clamps and jig table may be of the type described and illustrated in prior U.S. Pat. No. 3,238,867, also of common assignee herewith.

Elevated above conveyor 10 is a conveyor table generally indicated 14 and which forms a part of the unloading and stacking apparatus hereof generally indicated 16. The trusses emerging from the press 12 on conveyor 10 are peeled from the jig table for disposition on conveyor table 14 while the jig table continues along conveyor 10 below conveyor 14. In order to peel the truss from the jig table and dispose it on conveyor table 14, an unloading device for elevating the leading end of the truss onto conveyor table 14 as the truss emerges from the press is provided and is generally indicated 18. This truss elevating device may be of the type disclosed in U.S. Pat. No. 3,538,578 also of common assignee herewith. Briefly, a bar 19 underlying the leading end of the truss is pivoted to raise the truss end in response to a subsequent pressing action. That is, the press actuates a cylinder 20 which, in turn, retracts to pivot bar 19 upwardly thus elevating the truss end from the jig table and to an elevation above conveyor table 14. Upon further advancement of the jig table and truss along conveyor 10, the truss is peeled from the jig table and disposed on conveyor table 14 while the jig table is advanced along conveyor 10 below conveyor table 14. Conveyor table 14 comprises a plurality of rollers 22 several of which indicated at 24 are chain driven to advance truss T along conveyor 14 such that its end butts a pivoted plate 26 which actuates a switch 27 which in turn initiates the unloading and stacking cycle as hereinafter set forth.

Figure 3:
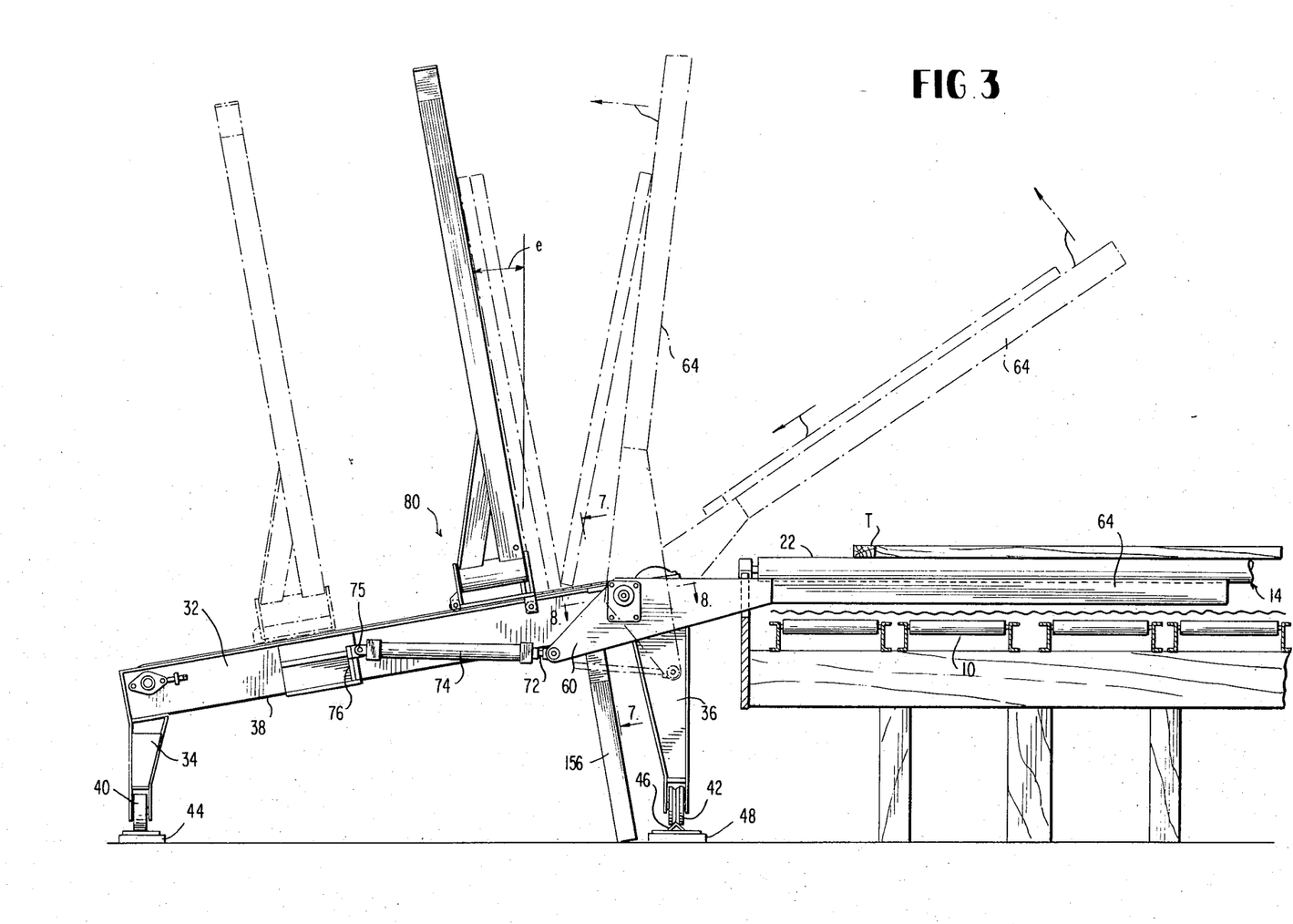
FIG. 3 is an enlarged cross sectional view of the right hand unloading and stacking assembly illustrated in FIG. 1 and taken generally about on line 3—3 in FIG. 1.

The unloading and stacking apparatus hereof generally indicated 16 comprises left and right hand unloading and stacking assemblies 28 and 30 which are constructed identically but for reversal of position of certain parts. Referring now to FIGS. 1 and 3, each unloading and stacking assembly comprises a support 32 having opposite end legs 34 and 36, the upper ends of which are connected by a rearwardly and downwardly inclined frame 38. Legs 34 and 36 each mount a pair of rollers 40 and 42, respectively. Rollers 40 are flat rollers and mounted on a flat support bed 44. Rollers 42 are V-grooved and are carried on an inverted angle 46 mounted on a support bed 48. Accordingly, it will be appreciated that each assembly 28 and 30 is mounted for rolling movement within a limited range in a direction parallel to conveyors 10 and 14.

Figures 7, 8:
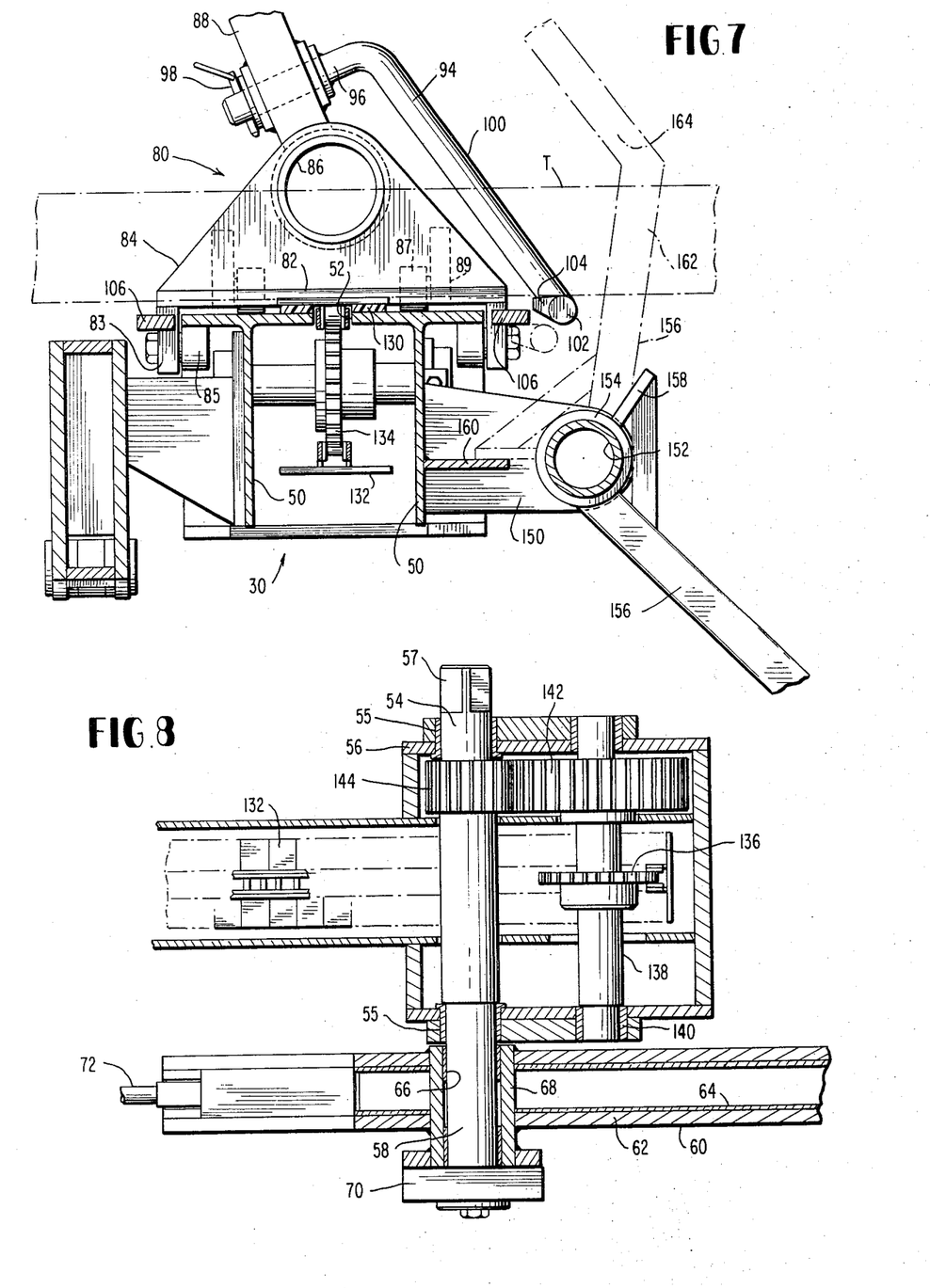
FIGS. 7 and 8 are enlarged fragmentary cross sectional views generally taken about on line 7—7 and 8—8, respectively, in FIG. 3.

As best illustrated in FIGS. 7 and 8, each support frame 38 comprises a pair of elongated T-shaped members 50 disposed in spaced side-by-side relation leaving a slot 52 between their near flanges and extending along the topside of frame 38. Adjacent the forward end of support frame 38, there is pivotally mounted a shaft 54 in bearings 55 carried at opposite sides of a gear box 56. A reduced diameter end portion 58 of shaft 54 projects outwardly to one side of gear box 56 while the opposite end of shaft 54 is squared as at 57. A lever arm 60 comprised of a pair of spaced plates 62 mounts a raising arm 64 formed of a rectangular tubular stock between plates 62. Lever arm 60 is carried on bearing 66 on shaft portion 58. Particularly, the plates 62 are secured to a stub tube 68 encircling shaft portion 58 about bearings 66. Tube 68 is, in turn, secured to a reversible ratchet clutch mechanism indicated 70 and per se of known construction. Ratchet clutch is coupled to tube 68 and shaft portion 58 such that raising motion of lift arm 64, for example, in a counterclockwise direction as illustrated in FIG. 3, causes the lever arm 60 to ratchet about shaft portion 58 while lowering movement of the lift arms 64 in the opposite direction, i.e., clockwise as illustrated in FIG. 3, locks the arm to shaft portion 58 thereby rotating shaft 54 in a like or clockwise direction. The rear end of lever 60 is pivotally coupled to a piston rod 72 which forms a part of a fluid actuated cylinder 74 pivotally mounted at its opposite end as at 75 to a bracket 76 suitably secured to one side of support frame 38. Accordingly, it will be appreciated that actuation of cylinders 74 to extend piston rods 72 causes the lift arms 64 to pivot from a generally horizontal position within the plane and between rollers 22 of conveyor table 14, i.e., a position underlying the truss T on conveyor table 14, to a substantially vertical but slightly over-center position, i.e., a pivotal distance greater than 90 degrees. Retraction of the piston rods 72 returns the lift arms from their over-center positions to their horizontal positions between the rollers 22 of conveyor 14.

Turning again to FIGS. 7 and 8, there is carried on each support frame 38 a carriage, generally indicated 80, comprised of a flat base plate 82 mounting spaced upstanding end brackets 84. Base plate 82 has a pair of flanges 83 which depend along its opposite sides and laterally beyond the flanges of T members 50. Rollers 85 are carried by the depending flanges and underlie the flanges of T members. Additional rollers 87 are provided on members 89 upstanding from base plate 82, the rollers 87 extending through slots in base plate 82 for bearing engagement along the upper surfaces of T members 50, whereby base plate 82 is mounted for movement along support 32.

Figure 6:
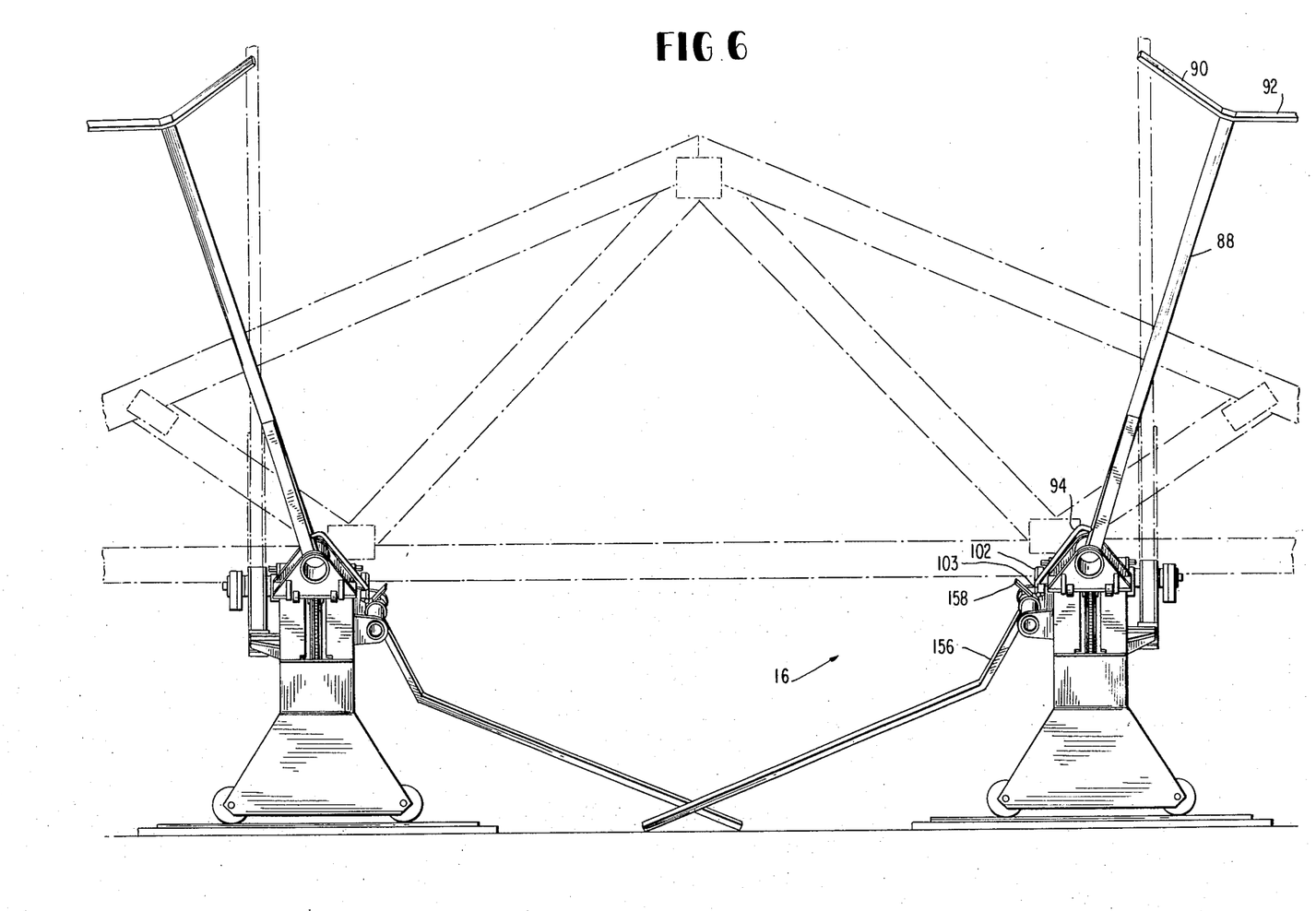
FIG. 6 is an enlarged side elevational view of the unloading and stacking assemblies hereof and schematically illustrating a truss in an unloaded stacked position.

Carried at opposite ends in brackets 84 is a tubular section 86 mounting a stacking arm 88. Tubular section 86 is freely pivotal in end plates 84 about a rearwardly inclined axis. Stacking arms 88 terminates at its distal end in a generally Y configuration having, as best illustrated in FIG. 6, a pair of legs 90 and 92 for reasons as will become apparent. As illustrated in FIG. 3, carriage 80 is inclined with support frame 32 and stacking arm 88 thus inclines rearwardly at an angle $e$ to the vertical. Thus, when the trusses are displaced by the raising arms 64 into an over-center position, the stacking arms 88 on assemblies 28 and 30 provide abutments against which the trusses rest in a slightly over-center generally vertical position as illustrated in FIG. 3.

Since each stacking arm 88 is freely pivotable in end brackets 84, there is provided a capture arm 94 for maintaining it in an upwardly extending position and prevent it from falling to one side or the other of the assemblies 28 and 30. The capture arm 94 comprises a tubular member having a leg 96 releasably secured within an opening formed in the base of the stacking arm 88. A suitable pin-type connection 98 retains leg 96 secured to stacking arm 88. The other leg 100 of capture arm 94 terminates at its end in a generally T-shaped element having legs 102 and 103, each of which have inwardly extending projections 104 along their lengths. A pair of capture plates 106 are mounted on opposite sides of support frame 38 adjacent its forward end. When the carriage 80 is adjacent the forward end of support 32, the projection 104 on one of the legs of the T of capture arm 94 (depending upon which side of the support 32 the stacking arm is located) underlies the capture plate 106 to retain the stacking arm 88 in an over-center position as illustrated in FIG. 7. For reasons hereinafter set forth, the capture arm 94 can be removed from the stacking arm 88 and inserted into the opening of stacking arm 88 from its opposite side whereby the leg 100 will extend along the opposite side of carriage 80 than as illustrated with the other leg of the T below the capture plate 106. Thus, the stacking arm 88 is releasably secured in the over-center position on one or the other side of the pivotal axis of tube 86 for reasons which will become apparent from the ensuing description. Also, for reasons hereinafter noted, the capture plates 106 extend rearwardly for a short distance along support frame 38.

Figure 4:
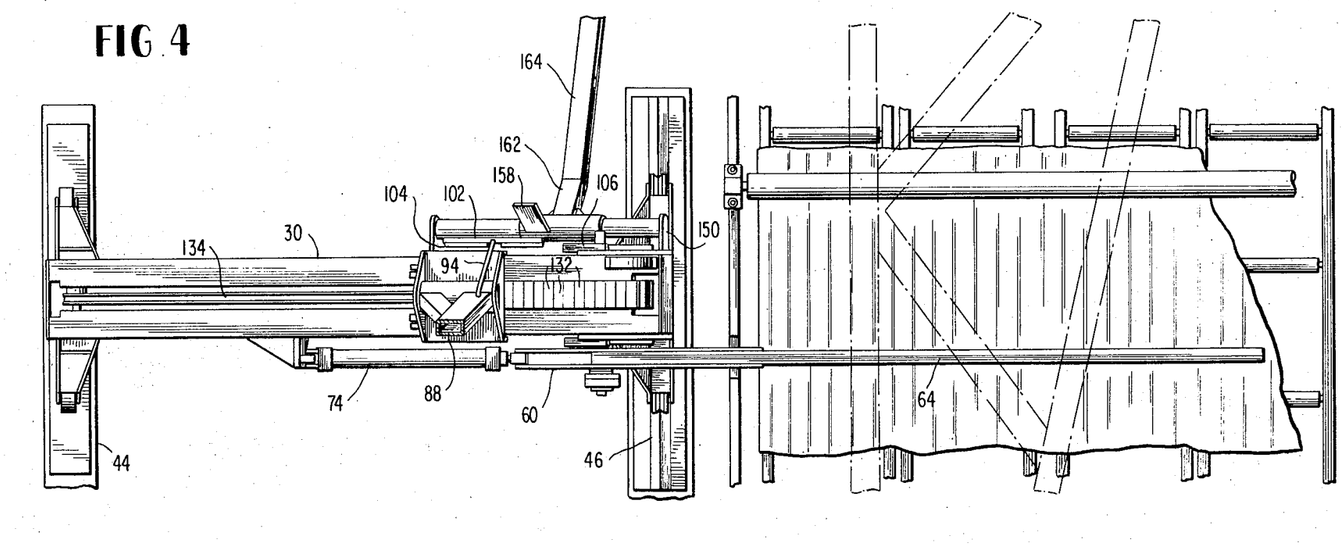
FIG. 4 is an enlarged fragmentary top plan view thereof.
Figure 5:
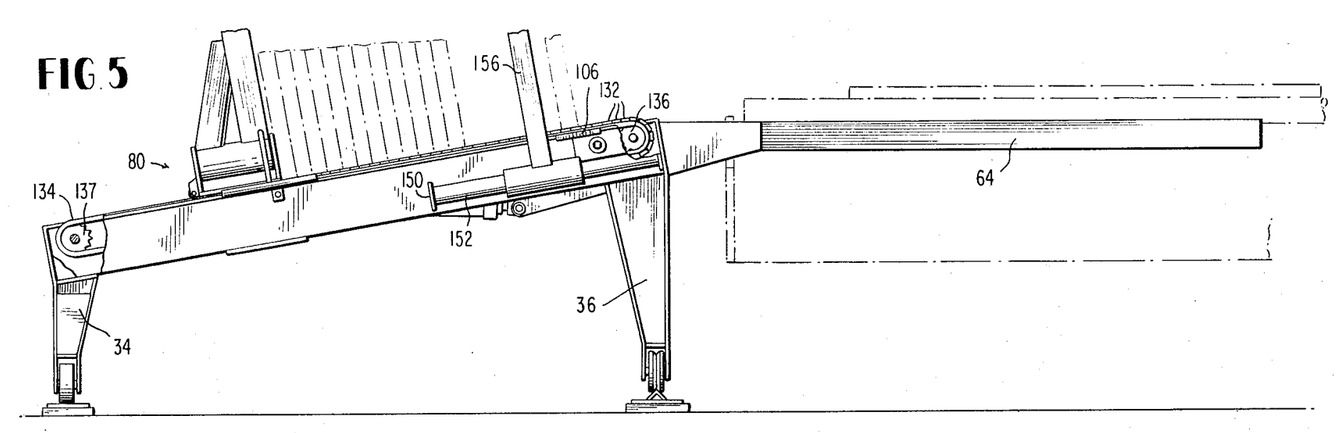
FIG. 5 is a view similar to FIG. 3 illustrating a plurality of trusses in a stacked position on the left hand unloading and stacking assembly as seen in FIG. 1 and with parts broken out and in cross section.

Referring again to FIGS. 7 and 8, there is provided astride slot 52 a pair of bearing surfaces 130 which extend the full length of support frame 38 and on which slides a tread 132. Tread 132 is coupled to a chain 134 reeved about a sprocket 136 at the forward end of the support frame 32 in gear box 56 and an idler sprocket 137 adjacent the rear end of support frame 38. (FIG. 4). Chain 134 is connected in driving relation to carriage 80. Sprocket 136 is carried on a shaft 138 mounted in suitable bearings 140 on opposite sides of gear box 56. Shaft 138 carries a gear 142 which lies in meshing engagement with a gear 144 on shaft 52. Gear 144 is smaller than gear 142 and thus a gear reduction is effected when the raising arm 64 is lowered and drives shaft 138 through gears 144 and 142. Thus, tread 132 is driven in response to lowering movement of the raising arm 64 which is transmitted thereto through tube 68, ratchet 70, shaft 58, gears 144 and 142 and shaft 138. For reasons hereinafter set forth, the carriage 80 and tread 132 retract along the bearing surfaces 130 a distance of about 1⅝ inch for each lowering movement of the raising arm 64.

A pair of brackets 150 project to one side of each support frame 38 and on the side thereof opposite the raising arm 64. Brackets 150 mount a tubular section 152 therebetween. Tubular section 152 inclines downwardly and rearwardly similarly as support frame 38. A short tubular section 154 encircles tube 152 and mounts a secondary stacking arm 156. Arm 156 is freely pivotable about tubular section 152 and is normally located in a position such that its tip rests on the ground as best illustrated in FIG. 6. Upon use thereof, each arm 156 is rotated to extend in a generally vertical direction, for example, to the dashed line position in the right hand unloading and stacking assembly illustrated in FIG. 7. To maintain the arms in a upright generally over-center position, each is provided a stop 158 on tubular section 154 which bears against a plate 160 carried on the side of support frame 38. Thus, the arms 156 can be manually rotated to a generally vertical but slightly over-center position illustrated in FIG. 7 with the weight of the arms maintaining the same in their over-center position. With reference to FIG. 7, the arm 156 has a base portion 162 and an upper portion 164 which is angles back from the base portion 162 such that the center of gravity of the arm in its over-center position lies on the inside of its axis of rotation.

Figure 9:
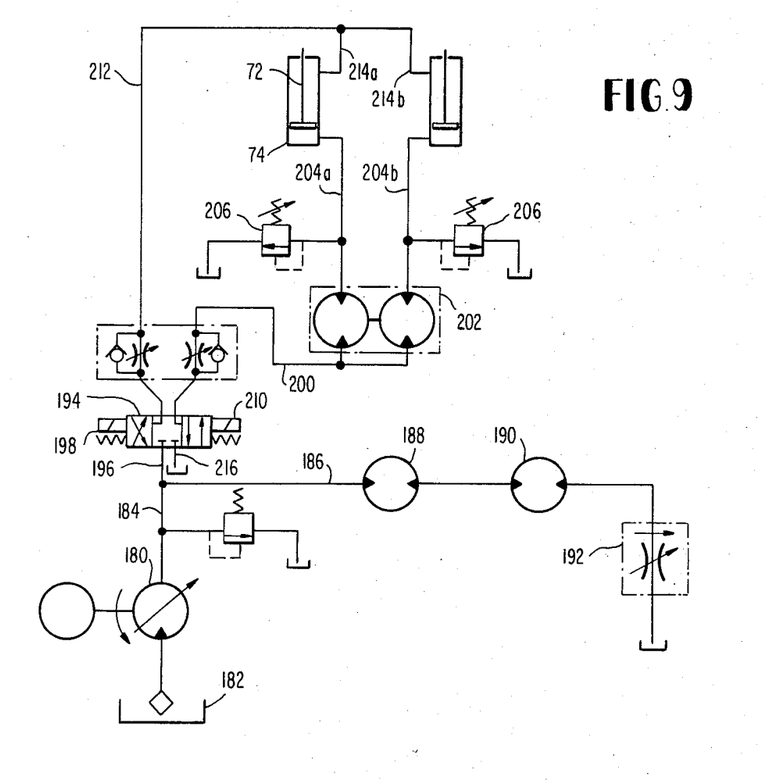
FIG. 9 is a schematic illustration of a fluid circuit for use with the apparatus hereof.

Referring now to FIG. 9, there is illustrated a fluid system for operating the raising arm cylinders 74 as well as the drive motors for the rollers 24 on conveyor table 14. Particularly, there is provided a hydraulic motor 180 for supplying fluid from a reservoir 182 via conduits 184 and 186 to continuously drive roller motors 188 and 190. Fluid from motors 188 and 190 flows through a flow control valve 192 for return to the reservoir. A four-way three-position solenoid-actuated spring return valve 194 lies in communication with conduit 184 via conduit 196. Solenoid 198 is energized in response to closing of switch 27 by the abutment of the truss against plate 26 (FIG. 1) to shift valve 194 to the right as seen in FIG. 9. In that valve position, fluid is provided cylinder 74 via conduits 184, 196 and 200, a flow divider 202, and conduits 204a and 204b whereby piston rods 72 are extended. Relief valves 206 are also provided in communication with conduits 204a and 204b. Fluid returns from the opposite sides of cylinders 74 to reservoir 182 via conduits 214a and 214b, 212, 196 and 184. A switch, not shown, is actuated by the raising arm lever 60 when the stacking arm obtains a generally vertical but slightly over-center position. This switch de-energizes solenoid 198 and energizes solenoid 210 to shift valve 194 to the left as seen in FIG. 9. Fluid is thus supplied from reservoir 182 via conduits 184, 196, 212, 214a and 214b to the opposite sides of the cylinders 72 thereby lowering raising arms 64 back to their position between the rollers 22 of conveyor table 14. In this position of the valve, exhaust fluid from the cylinders flows through conduit 204a, 204b, 200 and 216 back to the reservoir. A switch, not shown, is actuated upon return of the arms 64 between rollers 22 which de-energizes solenoid 210 whereupon the valve 194 is spring centered to await the next cycle.

The operation of the unloading and stacking apparatus hereof will now be described. As will be recalled, the trusses are peeled from the jig table for disposition on conveyor table 14 and are driven by the powered rollers 24 thereof to an abutment against end stop 26. Stop 26 actuates switch 27 in response to such abutment and which switch, in turn, actuates solenoid 198 to shift the valve 194 to a position supplying fluid under pressure to the cylinders 74. Actuation of cylinders 74 extends pistons 72 to pivot the raising arms 64, the arms carrying the truss therewith as they pivot through an over-center position as illustrated in FIG. 3. As the truss is raised on arms 64, it slides along the arms into engagement with the tread 132 at the forward end of support frame 38. When the arms reach an over-center position, the truss falls or pivots rearwardly away from raising arms 64 into engagement against stacker arms 88. It will be appreciated that the stacker arms have previously been advanced to their forwardmost position adjacent conveyor table 14 and have been raised to their stacking positions with the legs of the capture arms 94 engaging capture plates 106 to maintain the arms in their generally vertical positions. Also, the stop 26 limits the movement of the truss along the conveyor table 14 and it will be appreciated that with each truss being so limited, the trusses are accurately aligned one with the other in their vertical positions. When the raising arms 64 obtain their over-center positions, a switch, not shown, is actuated to de-energize solenoid 198 and energize solenoid 210 thereby to shift valve 194 such that fluid is supplied to the opposite end of cylinders 74. The raising arms 64 are thus lowered back to their original position between rollers 22 of conveyor table 14. It will be recalled that lowering movement of raising arms 64 rotates shafts 54 on which the arms are mounted through the ratchet clutch mechanisms 70 and thereby drives shafts 138 through gears 144 and 142. Shaft 138, in turn, rotates sprockets 136 to retract treads 132 and carriages 80 simultaneously rearwardly along assemblies 28 and 30. The gear reduction is such that the lowering movement of the raising arms from their over-center positions back to their horizontally disposed positions provides a linear movement of about 1⅝ inches in travel of the treads and carriages. It will be appreciated that the thickness of the structural elements comprising the most common type of trusses is 1⅝ inches. Consequently, the carriages 80 and stacker arms 88 are displaced rearwardly and downwardly a linear distance equal to such thickness thereby providing space on treads 132 for the disposition of an additional truss. The cycle is then repeated for additional trusses with the raising arms picking up and depositing them one against the other in in the manner depicted in FIG. 3, the stacker arms and carriages being displaced rearwardly in increments of about 1 5/8 inches each time the raising arms are lowered to pick up an additional truss.

It will be noted that capture arms 94 retain stacker arms 88 in generally upright but over-center positions through the engagement of projections 104 below capture plates 106. Plates 106, however, extend rearwardly only for a short distance. Consequently, for the initial three or four trusses, the capture arms 94 engage the capture plates 106 and prevent the arms from pivoting downwardly under their own weight. However, as the carriage and stacker arms are further retracted along support frames 38, the projections 104 slide past capture plates 106 freeing arms 88 for pivotal movement. However, after their release from capture plates 106, the legs 102 of capture arms 94 engage below the trusses stacked against stacker arm 88 and the weight of the trusses therefore maintains the stacker arm 88 in the illustrated substantially upright position. Preferably, the capture arms 94 are initially locked to the frame supports 38 for the stacking of four trusses, i.e., a distance of travel of the carriages 80 and stacker arms 88 of approximately 6½ inches. After such travel, the stacker arms are maintained in position by the weight of the trusses stacked.

When a predetermined number of trusses have been stacked one against the other on the support frames 38, and the stacker arms 88 and carriages 80 obtain positions adjacent the rear of assemblies 28 and 30, the trusses are normally banded one to the other. Thereafter, the bundled trusses can be removed from the stacking apparatus simply by lifting the trusses from the treads 132, for example, by a forklift truck. Upon lifting the bundled trusses, the stacker arms 88 are free to swing to one side of the assemblies 28 and 30 and obtain downwardly inclined positions resting on their outermost legs. Thus, the bundled trusses can be withdrawn from between assemblies 28 and 30 without interference from the stacker arms 88. Once the bundled trusses have been removed, the carriages 80 and stacker arms 88 can be moved forward along assemblies 28 and 30 to their initial positions. This can be accomplished by applying a crank to the squared ends of shafts 54. When the carriage 80 and stacker arms 88 obtain their forwardmost positions, the arms 88 can be manually raised whereupon the projections 104 can be snapped past the capture plates 104 whereby the capture arms 94 will again retain stacking arms 88 in their generally vertical center positions.

It is a further feature hereof that additional trusses can be stacked on the unloading and stacking apparatus hereof while the trusses stacked against stacking arms 88 are being banded together and removed from the apparatus. That is, the truss fabrication line need not be halted while the stacked trusses are banded and removed from the unloading apparatus. When the trusses are being banded, the secondary stacking arms 196 can be rotated such that the arms 164 obtain an over-center generally vertical position with brackets 158 bearing on plates 160 as illustrated in FIG. 7. Additional trusses can thus be elevated to the stacked over-center position against the secondary stacking arms 164 similarly as against the stacking arms 88. The arms 164 are, however, free for only limited rearward movement and thus have a capability of stacking only an additional four or five trusses. However, this provides sufficient time for the trusses stacked against arms 88 to be bundled and removed and for the carriages 80 and stacking arms 88 to be moved forwardly. When stacking arms 88 lie close to their forwardmost positions, they are manually pivoted to their generally vertically extending over-center positions such that the legs 102 on capture arms 94 underlie the trusses stacked against secondary stacking arms 164. Upon further forward movement of the carriages 80 and stacking arms 88 the trusses are transferred from the stacked position against secondary arms 164 to a stacked position against arms 88. The secondary arms 164 are then free for rotation downwardly to an out-of-the-way position as illustrated in FIG. 6. Thus, the production line can continue uninterrupted as the stacked trusses are banded together and removed from the assemblies 28 and 30.

It will be appreciated that the stacking arms 88 are symmetrical about their centerlines. This permits the stacking arms to lie in an over-center position on either side of the pivotal axis of their mounting on carriages 80. Thus, each stacking arm 88 can be secured to the respective assembly 28 or 30 such that it can fall to a selected side thereof. To accomplish this, the capture arms 94 are releasably secured to the stacking arms 88 by pin connections 98 illustrated in FIG. 7. The capture arms 94 are also symmetrical about their centerlines. Consequently, by removing leg 96 from one of the stacking arms 88 as illustrated in FIG. 7, and inserting it on the other side of such stacking arm 88, the arm 88 can be moved to an over-center position on the opposite side of its pivotal axis with the other leg 103 of capture arm 94 engaging below the capture plate 106 on the other side of the assembly. The operation of the stacking arms is as previously described irrespective of the side to which the arm will fall upon removal of the stacked trusses.

Figure 10:
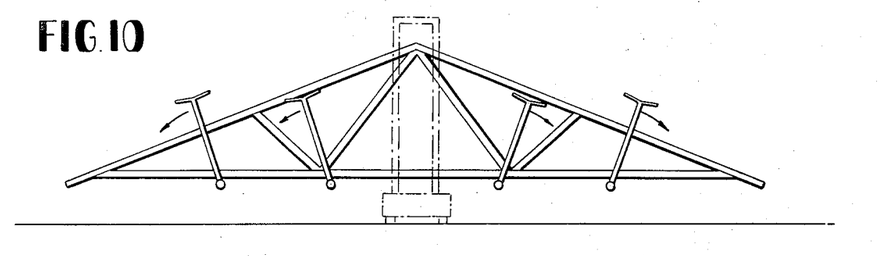
FIGS. 10 and 11 are schematic reprsentations of further embodiments of the unloading and stacking apparatus hereof.
Figure 11:
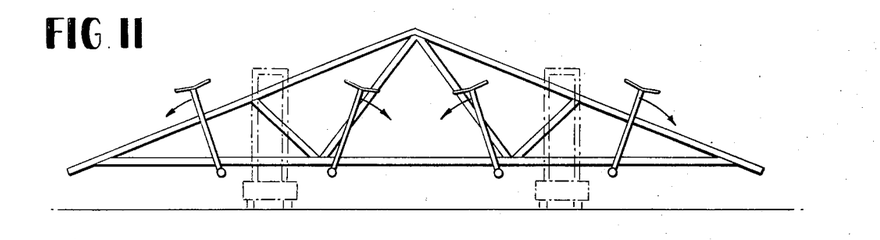

This is significant as the stacking arms 88 must lie clear from and not interfere with the forklift truck or other devices for removing the stacked trusses from assemblies 28 and 30 as it is brought between the assemblies 28 and 30 to lift the trusses therefrom. Also, the stacking arms 88 must fall clear of the area between the assemblies occupied by a forklift truck as it removes the banded trusses from assemblies 28 and 30. Thus, when two assemblies 28 and 30 are utilized, the arms are mounted such that they lie in over-center positions outwardly of the assemblies. In FIGS. 10 and 11, there are schematically illustrated four similar assemblies. In FIG. 10, the stacking arms 88 of the assemblies on the left side of the center of the trusses lie over-center such that they fall to the left as illustrated upon removal of the trusses from the assemblies. The stacking arms 88 on the right side of the centerline of the truss lie in an over-center position such that they will fall to the right as illustrated upon removal of the trusses. This permits a forklift truck schematically illustrated at 200 to run in between the two central unloading assemblies and lift the banded trusses from the four assemblies without interference from the stacking arms while lifting the trusses or as they fall. For particularly large heavy trusses, it may at times be desirable to utilize four such assemblies as previously described and two forklift trucks to remove the trusses from the assemblies. In this situation, the pair of assemblies on the opposite sides of the middle of the truss will have their stacking arms 88 mounted to fall away from one another as illustrated. This permits a forklift truck to engage the banded trusses between the stacking and unloading assemblies on each of the opposite sides of the trusses without interference from the stacking arms 88.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for unloading a plurality of structural wooden frames successively disposed in a generally horizontal position on a support comprising:

a support structure, means for raising the frames from a generally horizontal position on the support to a generally upright position on said support structure including a member carried by said support structure for movement from a generally horizontally extending first position underlying a frame on the support to a generally upright second position for disposing the frame on said support structure in a generally upright position and for return movement to said first position, means carried by said support structure for moving said member between said first and second positions, means on said support structure for supporting the frames in their generally upright position when said member lies away from said second position including means for moving the frames while in their upright supported position in a generally horizontal direction away from said support an incremental distance approximately equal to the thickness of one frame in response to movement of said member between said first and second positions, said frame support means including a support arm mounted for pivotal movement about an axis extending in a generally horizontal direction parallel to the direction of movement of the frames on said support structure, said arm being pivotal between a position for supporting the generally vertically disposed frames and a non-support position to one side of said support structure to facilitate removal of the frames from the support structure.

2. Apparatus according to claim 1 wherein said support arm forms an angle with the plane containing the member in said first position thereof slightly greater than a right angle, said member being movable into said second position to engage the frames against the upstanding support arm whereby the frames are supported in a slightly inclined over-center position.

3. Apparatus according to claim 2 wherein said support structure includes a base, a carriage carried by said base for movement in a generally horizontal direction, said support arm being pivotally carried by said carriage for movement therewith in said generally horizontal direction and between a generally upstanding position for supporting the frames in the generally upright position and a lowered frame non-support position, and means for releasably locking said arm in said frame supporting position.

4. Apparatus according to claim 3 including an auxiliary support arm for the frames, said auxiliary arm being carried by said base for movement between a frame supporting position and a frame non-supporting position, said auxiliary arm being movable into said support position for receiving frames from said member when said first mentioned arm remains in a position supporting frames previously received from said member.

5. Apparatus according to claim 1 wherein said support arm is carried by the latter moving means for movement with the frames in said generally horizontal direction.

6. Apparatus for unloading a plurality of structural wooden frames successively disposed in a generally horizontal position on a support comprising:

a support structure, means for raising the frames from a generally horizontal position on the support to a generally upright position on said support structure including a member carried by said support structure for movement between a generally horizontally extending first position underlying a frame on the support and a generally upright second position for disposing the frame on said support structure in a generally upright position, means carried by said support structure for moving said member between said first and second positions, means on said support structure for supporting the frames in their generally upright position when said member lies away from said second position including means for moving the frames while in their upright position in a generally horizontal direction a predetermined distance at least equal to the thickness of one frame in response to movement of said member between said first and second positions, said frame moving means being adapted to move the frame generally horizontally in response to movement of said member from said second position to said first position.

7. Apparatus according to claim 6 wherein the support includes a platform, means for conveying the frame along said platform into a position overlying said member, and means carried by said apparatus and responsive to the movement of the frame into said overlying position for pivoting said member thereby to lift the frame from said platform.

8. Apparatus according to claim 7 including means for sensing the position of said member in said generally upright position, and means responsive to said sensing means for returning said member to said generally horizontally disposed position thereof.

9. Apparatus according to claim 6 wherein said support structure includes a base, a carriage carried by base for movement in a generally horizontal direction, a support arm upstanding from said carriage and movable therewith, said support arm being adapted to receive the frames from said member and support the same in a generally upright position with the frames accumulated one against the other, means for moving said carriage along said base in a direction away from said support incremental distances about the thickness of each of said frames for each successive frame moved into the supported position whereby the frames are accumulated one against the other on said support structure and against said support arm in their generally upright position, means responsive to movement of said member from said second position to said first position for advancing said carriage and support arm along said base away from the support successive incremental distances each substantially about the thickness of the frame.

10. Apparatus according to claim 6 wherein the support structure includes a base, a carriage carried by said base for movement in a generally horizontal direction, a support arm upstanding from the carriage and movable therewith, said support arm being adapted to receive the frames from said member and support the same in a generally upright position with the frames accumulated one against the other, means for moving said carriage along said base in a direction away from the support incremental distances about the thickness of each of said frames for each successive frame moved into the supported position whereby the frames are accumulated one against the other on said support means and against said support arm in their generally upright position, said support arm being pivotally carried by said carriage for movement between said generally upstanding frame supporting position and a lowered non-support position, and means for releasably locking said support arm in said frame supporting position.

11. Apparatus for unloading a plurality of structural wooden frames successively disposed in a generally horizontal position on a support comprising:

a support structure, means for raising the frames from a generally horizontal position on the support to a generally upright position on said support structure including a member carried by said support structure for movement between a generally horizontally extending first position underlying a frame on the support and a generally upright second position for disposing the frame on said support structure in a generally upright position, means carried by said support structure for moving said member between said first and second positions, means on said support structure for supporting the frames in their generally upright position when said member lies away from said second position including means for moving the frames while in their upright position in a generally horizontal direction a predetermined distance at least equal to the thickness of one frame in response to movement of said member between said first and second positions, said support structure including a conveyor, said member being pivotally carried by said support structure for movement in one direction from said first to said second position and in the opposite direction from said second to said first position, and means coupled between said conveyor and said member for advancing the frames along said conveyor said predetermined distance in response to pivotal movement of said member in other direction.

12. Apparatus for unloading a plurality of structural wooden frames successively disposed in a generally horizontal position on a support comprising:

a support structure, means for raising the frames from a generally horizontal position on the support to a generally upright position on said support structure including a member carried by said support structure for movement between a generally horizontally extending first position underlying a frame on the support and a generally upright second position for disposing the frame on said support structure in a generally upright position, means carried by said support structure for moving said member between said first and second positions, means on said support structure for supporting the frames in their generally upright position when said member lies away from said second position including means for moving the frames while in their upright position in a generally horizontal direction a predetermined distance at least equal to the thickness of one frame in response to movement of said member between said first and second positions, said frame support means including at least one support arm upstanding from said support structure and forming an angle with the plane containing the member in said first position thereof slightly greater than a right angle, said member being movable into said second position to engage the frames against the upstanding support arm whereby the frames are supported in a slightly inclined over-center position, said support structure including a base, a carriage carried by said base for movement in a generally horizontal direction, said support arm being pivotally carried by said carriage for movement therewith in said generally horizontal direction and between a generally upstanding position for supporting the frames in the generally upright position and a lowered frame non-support position, and means for releasably locking said arm in said frame supporting position, said releasable locking means including means for unlocking said arm from said frame supporting position in response to the removal of the frames from the support structure and permitting movement of said arm to said lowered position.

13. Apparatus for unloading a plurality of structural wooden frames successively disposed in a generally horizontal position on a support comprising:

a support structure, means for raising the frames from a generally horizontal position on the support to a generally upright position on said support structure including a member carried by said support structure for movement between a generally horizontally extending first position underlying a frame on the support and a generally upright second position for disposing the frame on said support structure in a generally upright position, means carried by said support structure for moving said member between said first and second positions, means on said support structure for supporting the frames in their generally upright position when said member lies away from said second position including means for moving the frames while in their upright position in a generally horizontal direction a predetermined distance at least equal to the thickness of one frame in response to movement of said member between said first and second positions, said frame support means including at least one support arm upstanding from said support structure and forming an angle with the plane containing the member in said first position thereof slightly greater than a right angle, said member being movable into said second position to engage the frames against the upstanding support arm whereby the frames are supported in a slightly inclined over-center position, said support structure including a base, a carriage carried by said base for movement in a generally horizontal direction, said support arm being pivotally carried by said carriage for movement therewith in said generally horizontal direction and between a generally upstanding position for supporting the frames in the generally upright position and a lowered frame non-support position, and means for releasably locking said arm in said frame supporting position, said releasable locking means including means carried by said arm and co-operable with said base throughout movement of said arm in the generally horizontal direction a predetermined distance relative to said base for maintaining said arm in the frame supporting position.

14. Apparatus according to claim 13 wherein said latter means includes a locking element carried by said arm and engageable with a keeper carried by said base, said locking element being releasable from said keeper in response to movement of said carriage said predetermined distance and engageable with the underside of the frames in response to further movement of said carriage in the horizontal direction relative to said base whereby the frames on the base maintain said arm in an upstanding position, said arm being released for movement from its upstanding position to its lowered position in response to removal of the frames from said supporting means.

15. Apparatus for unloading and accumulating press manufactured jig mounted wooden frames comprising:

means for moving a jig table adapted to carry the wooden frames along a predetermined path, a generally horizontally disposed platform superadjacent said predetermined path, means for successively moving the frames from the jig table onto the platform in response to movement of said jig table along said predetermined path, frame supporting means, means for swinging the frames successively from generally horizontally disposed positions on said platform to generally upright positions adjacent said platform and on said frame supporting means, said swinging means including a member initially underlying the successive frames on said platform and movable from a generally horizontal position to a generally upright position, said support means including a base, a carriage carried by said base for movement in a generally horizontal direction, and a support arm upstanding from said carriage and movable therewith, said support arm being adapted to receive the frames from said member and support the same in a generally upright position with the frames accumulated one against the other, means for moving said carriage along said base in a direction away from said platform incremental distances about the thickness of each of said frames for each successive frame moved into the supported position whereby the frames are accumulated one against the other on said support means and against said support arm in their generally upright position, said support arm being pivotally carried by said carriage for movement between said generally upstanding frame supporting position and a lowered non-support position, and means for releasably locking said support arm in said frame supporting position, said releasable locking means including means responsive to the removal of the frames from the supporting position for unlocking said arm from its frame supporting position and permitting movement thereof to a non-support position.

16. Apparatus for unloading and accumulating press manufactured jig mounted wooden frames comprising:

means for moving a jig table adapted to carry the wooden frames along a predetermined path, a generally horizontally disposed platform superadjacent said predetermined path, means for successively moving the frames from the jig table onto the platform in response to movement of said jig table along said predetermined path, frame supporting means, means for swinging the frames successively from generally horizontally disposed positions on said platform to generally upright positions adjacent said platform and on said frame supporting means, said swinging means including a member initially underlying the successive frames on said platform and movable from a generally horizontal position to a generally upright position, said support means including a base, a carriage carried by said base for movement in a generally horizontal direction, and a support arm upstanding from said carriage and movable therewith, said support arm being adapted to receive the frames from said member and support the same in a generally upright position with the frames accumulated one against the other, means for moving said carriage along said base in a direction away from said platform incremental distances about the thickness of each of said frames for each successive frame moved into the supported position whereby the frames are accumulated one against the other on said support means and against said support arm in their generally upright position, said support arm being pivotally carried by said carriage for movement between said generally upright frame supporting position and a lowered non-support position, and means for releasably locking said support arm in said frame supporting position, said support arm being carried by said carriage for pivotal movement from said frame support position in opposite directions to frame non-support positions on opposite sides of said base, said releasable locking means including a pair of keepers carried by said base on opposite sides of the pivotal axis of said arm, and a locking element releasably carried by said arm for engagement therewith in one of two positions, said element in one position of engagement with said arm being engageable with one of said keepers to maintain the arm in an upstanding frame supporting position inclined to one side of its pivotal axis and from swinging movement in one direction, said element in its other position of engagement with said arm being engageable with the other of said keepers to maintain the arm in an upstanding frame supporting position inclined to the other side of its axis and from swinging movement in the opposite direction.

17. Apparatus according to claim 16 wherein said element is released from locking engagement with one of the keepers in response to movement of said carriage a predetermined distance from said platform.

* * * * *

UNITED STATES PATENT OFFICE
CERTIFICATE OF CORRECTION

Patent No. 3,811,578      Dated May 21, 1974

Inventor(s) JOHN CALVIN JUREIT and ADOLFO CASTILLO

It is certified that error appears in the above-identified patent and that said Letters Patent are hereby corrected as shown below:

Col. 2, line 54, "numer" should read --number--.

Col. 5, line 49, "of a rectangular" should read --of rectangular--.

Col. 6, line 27, "arms 88" should read --arm 88--.

Col. 12, line 39, claim 6, "the frame" should read --the frames--.

Col. 13, line 57, claim 11, "other" should read --said other--.

Col. 16, line 39, claim 16, "upright" should read --upstanding--.

Signed and sealed this 29th day of October 1974.

(SEAL)
Attest:

McCOY M. GIBSON JR.
Attesting Officer

C. MARSHALL DANN
Commissioner of Patents